US009787744B2

(12) United States Patent
Truax

(10) Patent No.: US 9,787,744 B2
(45) Date of Patent: *Oct. 10, 2017

(54) FEEDBACK OPTIMIZED VIDEO CODING PARAMETERS

(71) Applicant: Amazon Technologies, Inc., Reno, NV (US)

(72) Inventor: Gregory K. Truax, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/243,698

(22) Filed: Aug. 22, 2016

(65) Prior Publication Data

US 2016/0359939 A1 Dec. 8, 2016

Related U.S. Application Data

(63) Continuation of application No. 14/736,511, filed on Jun. 11, 2015, now Pat. No. 9,426,018, which is a (Continued)

(51) Int. Cl.
*H04L 29/06* (2006.01)
*H04N 21/442* (2011.01)
(Continued)

(52) U.S. Cl.
CPC ...... *H04L 65/602* (2013.01); *H04L 29/06027* (2013.01); *H04L 65/4084* (2013.01); *H04L 65/4092* (2013.01); *H04L 65/80* (2013.01); *H04L 67/2842* (2013.01); *H04L 67/306* (2013.01); *H04N 19/12* (2014.11); *H04N 19/156* (2014.11); *H04N 19/164* (2014.11); *H04N 19/172* (2014.11); *H04N 19/61* (2014.11); *H04N 21/00* (2013.01);
(Continued)

(58) Field of Classification Search
CPC ............. H04L 29/06027; H04L 67/306; H04L 65/4084; H04L 65/4092; H04L 65/602; H04L 65/80; H04N 19/61; H04N 21/44209; H04N 21/6125; H04N 21/6379; H04N 21/00
USPC ..................................................... 375/240.07
See application file for complete search history.

(56) References Cited

U.S. PATENT DOCUMENTS 5,500,673 A 3/1996 Zhou
7,818,444 B2 10/2010 Brueck et al.
(Continued)

OTHER PUBLICATIONS

"Non Final Office Action dated Dec. 31, 2015" received in U.S. Appl. No. 14/736,511.

(Continued)

*Primary Examiner* — Hee-Yong Kim
(74) *Attorney, Agent, or Firm* — Hogan Lovells US LLP

(57) ABSTRACT

A system for managing delivery of video content. The system includes a controller and one or more players. The controller may be configured to control generation of a plurality of streams containing the video content based upon feedback regarding decoding at least one of the plurality of streams. The one or more players may be configured to select a stream from the plurality of streams, generate decoding statistics for the selected stream, and send the decoding statistics to the controller as the feedback.

20 Claims, 3 Drawing Sheets

Related U.S. Application Data continuation of application No. 13/323,007, filed on Dec. 12, 2011, now Pat. No. 9,071,484.

(60) Provisional application No. 61/471,879, filed on Apr. 5, 2011.

(51) Int. Cl.

| | |
|---|---|
| ***H04N 19/164*** | (2014.01) |
| ***H04N 21/433*** | (2011.01) |
| ***H04N 21/6379*** | (2011.01) |
| ***H04L 29/08*** | (2006.01) |
| ***H04N 21/61*** | (2011.01) |
| ***H04N 19/61*** | (2014.01) |
| ***H04N 21/00*** | (2011.01) |
| ***H04N 19/172*** | (2014.01) |
| ***H04N 19/12*** | (2014.01) |
| ***H04N 19/156*** | (2014.01) |
| *H04N 19/13* | (2014.01) |
| *H04N 19/115* | (2014.01) |

(52) U.S. Cl.

CPC ... *H04N 21/4331* (2013.01); *H04N 21/44209* (2013.01); *H04N 21/6125* (2013.01); *H04N 21/6379* (2013.01); *H04N 19/115* (2014.11); *H04N 19/13* (2014.11)

(56) References Cited

U.S. PATENT DOCUMENTS

| | | | |
|---|---|---|---|
| 9,071,484 | B1 | 6/2015 | Truax |
| 2005/0055725 | A1* | 3/2005 | Stewart ............. H04N 7/17336 725/92 |
| 2008/0101466 | A1 | 5/2008 | Swenson et al. |
| 2009/0270170 | A1 | 10/2009 | Patton |
| 2011/0069756 | A1 | 3/2011 | Matthews |
| 2011/0249127 | A1 | 10/2011 | Zhang |
| 2011/0268186 | A1 | 11/2011 | Mukherjee et al. |
| 2013/0060911 | A1 | 3/2013 | Nagaraj et al. |

OTHER PUBLICATIONS

"Notice of Allowance dated May 6, 2016" received in U.S. Appl. No. 14/736,511.

"Non Final Office Action dated Jul. 31, 2014" received in U.S. Appl. No. 13/323,007.

"Final Office Action dated Dec. 29, 2014" received in U.S. Appl. No. 13/323,007.

"Notice of Allowance dated Apr. 16, 2015" received in U.S. Appl. No. 13/323,007.

"Notice of Allowance dated May 19, 2015" received in U.S. Appl. No. 13/323,007.

* cited by examiner

FEEDBACK OPTIMIZED VIDEO CODING PARAMETERS

This application is a continuation of allowed U.S. application Ser. No. 14/736,511, filed Jun. 11, 2015, which is a continuation of U.S. application Ser. No. 13/323,007, filed Dec. 12, 2011, which claims the benefit of U.S. Provisional Application No. 61/471,879, filed Apr. 5, 2011, each of which is incorporated by reference in their entirety.

FIELD OF THE INVENTION

The present invention relates to video distribution generally and, more particularly, to a method and/or architecture for feedback optimized video coding parameters.

BACKGROUND OF THE INVENTION

Content cached in a content delivery network or content distribution network (CDN) is generated by content providers. The content providers generate a fixed number of versions (or streams) of the content based on expected demand. Conventional content delivery solutions use an encoding device to produce several streams with a variety of predetermined encoding parameters simultaneously. The content delivery network delivers the content to an audience using the plurality of streams having the variety of encoding parameters. However, because the number of streams and variety of encoding parameters is fixed, the conventional solutions can fail to provide the audience with an optimal experience.

It would be desirable to have a system for delivering content that could provide an optimal experience to consumers of the content.

SUMMARY OF THE INVENTION

The present invention concerns a system for managing delivery of content. The system includes a controller and one or more players. The controller may be configured to control generation of a plurality of streams containing the content based upon feedback regarding decoding at least one of the plurality of streams. The one or more players may be configured to select a stream from the plurality of streams, generate decoding statistics for the selected stream, and send the decoding statistics to the controller as the feedback.

The objects, features and advantages of the present invention include providing a method and/or architecture for feedback optimized video coding parameters that may (i) adjust encoding parameters of one or more encoders based upon automated feedback, (ii) generate said automated feedback without user interaction (e.g., computer generated), (iii) generate a plurality of streams containing video content, (iv) maximize quality for a current audience, (v) maximize audience size for a given bandwidth allocation, (vi) maximize audience size for a given delivery cost, and/or (vii) minimize a number of streams needed for a given audience.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Adaptive bitrate content delivery solutions may use an encoding device to produce several streams with different encoding parameters simultaneously. In one example, the content delivery may comprise delivering content (e.g., video, audio, audio-video, etc.) to an audience using a plurality of streams (e.g., video streams, audio streams, audio-video streams, etc.) having a variety of encoding parameters. In one example, the encoding parameters may be created by an operator (or content provider) in advance of producing a live event or a set of Video On Demand (VOD) files for adaptive bitrate distribution to consumers (e.g., viewers, listeners, etc.). In an example embodiment, the present invention generally provides a method and/or apparatus for automatically configuring encoding parameters based on real-time feedback from client (decoder) devices.

Figure 1:
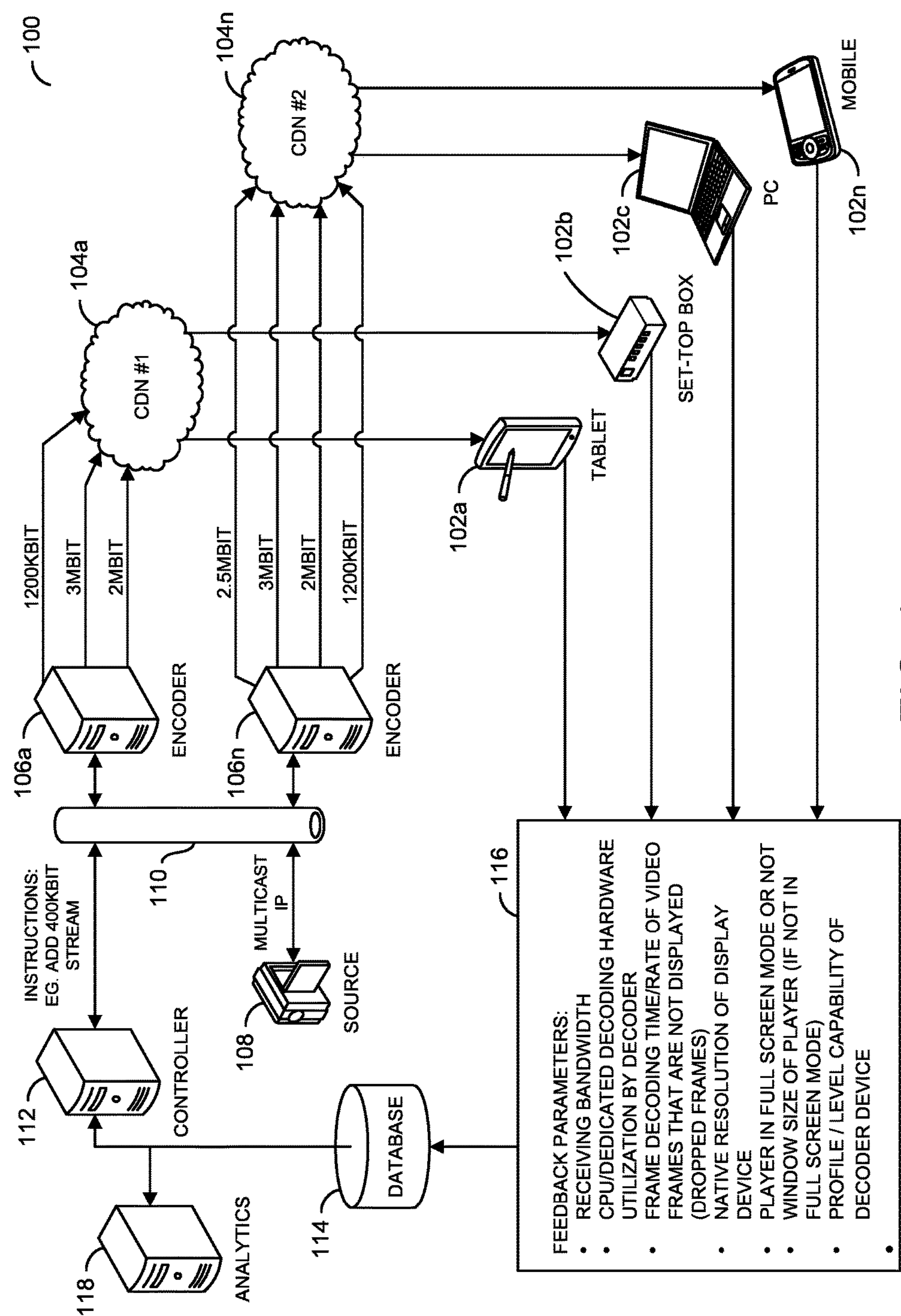
FIG. 1 is a diagram illustrating an example system in accordance with an embodiment of the present invention.

Referring to FIG. 1, a diagram of a system 100 is shown illustrating a content distribution system in accordance with an embodiment of the present invention. The system 100 may comprise, in one example, a number of client devices 102*a*-102*n*, a number of content distribution networks (CDNs)/mobile carriers (MCs) 104*a*-104*n*, a plurality of encoders 106*a*-106*n*, a content source 108, a content provider network 110, and a controller 112. In one example, player applications may reside on, a number of client devices 102*a*-102*n*. The client devices 102*a*-102*n* may include computers, set-top boxes, cellular telephones, tablets, and other mobile devices. The client devices 102*a*-102*n* may be configured to receive content (e.g., video, audio, audio-video, etc.) from the CDNs/MCs 104*a*-104*n*. The client devices 102*a*-102*n* may be connected to the CDNs/MCs 104*a*-104*n* using wired (e.g., cable), wireless (e.g., Wi-Fi, satellite, etc.), third generation (3G), and/or fourth generation (4G) links. Communication between the client devices 102*a*-102*n* and the CDNs/MCs may be handled by protocols including, but not limited to, HTTP and/or RTMP. Streaming technologies such as Pantos from Apple, Inc. or Smooth Streaming from Microsoft Corp. may be used. The CDNs/MCs 104*a*-104*n* generally make a plurality of streams available to the client devices 102*a*-102*n*. The client devices 102*a*-102*n* generally select one of the plurality of available streams based on particular capabilities of the client device. The plurality of streams are generally created by the plurality of encoders 106*a*-106*n*. For example, the encoders 106*a*-106*n* may encode content received from the source (or content provider) 108 via multicast IP on the content provider network 110. However, the content could also be raw video on SDI, files over FTP, etc. Parameters used by the encoders 106*a*-106*n* in encoding the plurality of streams are generally managed/adjusted by the controller 112 (e.g., via the network 110).

The controller 112 may be configured to optimize system parameters based upon one or more factors, including, but not limited to, maximum quality for the current audience (e.g., highest bitrates at optimal resolutions with smoothest playback), maximum audience size for a given bandwidth allocation or CDN/MC cost, and minimum set of streams for a given audience. Content Delivery Networks (CDNs) and mobile carriers (MC) typically charge customers for the amount of data sent to users. The controller 112 may choose to lower bitrates of some of the streams generated by the encoders 106*a*-106*n* to reduce CDN/MC costs. The controller 112 may be configured to limit the decrease in bitrates to only those levels where viewers will not stop watching due to poor quality. If encoding capacity (for live) or stream variant storage (for VOD) is a limiting factor, the system 100 may be configured to adjust the number of streams being created to serve the largest portion of the audience. In a multi-channel environment, adjusting the number of streams may ensure that a limited set of encoding hardware may serve as many channels as possible, while giving the best quality to the most-watched or highest revenue channels.

In one example, the encoding parameters adjusted by the controller 112 (e.g., to better fit the current audience) may include, but are not limited to, one or more of display resolution, bitrate, profile and level, Group Of Picture (GOP) structure, and entropy coding. For example, if most streams are being sent in a display resolution of 1280×720 but most clients have a native resolution of 960×640, the controller 112 may determine that several streams should be switched to a 960×640 resolution. In an example involving bitrate, a system may be generating a couple of streams, one stream at 1 Mbit and another at 2 Mbit. If most viewers are currently watching the 1 Mbit stream and have some extra bandwidth, but not enough for 2 Mbit, the system implemented in accordance with an embodiment of the present invention may, for example, move the 1 Mbit stream to 1.5 Mbit and add an 800 Kbit stream to cover all of the users, based on the optimization strategy.

The controller 112 may receive feedback information from one or more of the client devices 102*a*-102*n* viewing the live event or VOD asset. The feedback information may be automatically generated (e.g., computer generated) by the client devices 102*a*-102*n*. In one example, the controller 112 may communicate with a database 114. The database 114 may compile real time player metrics 116 from the client devices 102*a*-102*n* for all current viewers. In one example, the metrics (or feedback parameters) may include, but are not limited to, receiving bandwidth, CPU/dedicated decoding hardware utilization by decoder application, frame decoding time/rate of video frames that are not displayed (e.g., dropped frames), native resolution of a respective display device, whether player is in full screen mode or not, window size of player (if not in full screen mode), and profile/level capability of decoder device. In another example, an optional analysis system 118 may be connected to the controller 112. The analysis system 118 may be configured, in one example, to apply heuristics to compute a more optimized set of encoding parameters for the current audience. The controller 112 may signal the encoding device(s) 106*a*-106*n* to change the set of streams being produced, based upon the information from the client devices 102*a*-102*n* and/or the optional analysis system 118, to provide an optimized viewing experience. A new client manifest may be sent to the player(s) 102*a*-102*n*, so that the player(s) 102*a*-102*n* may choose to utilize a new stream when appropriate.

Figure 2:
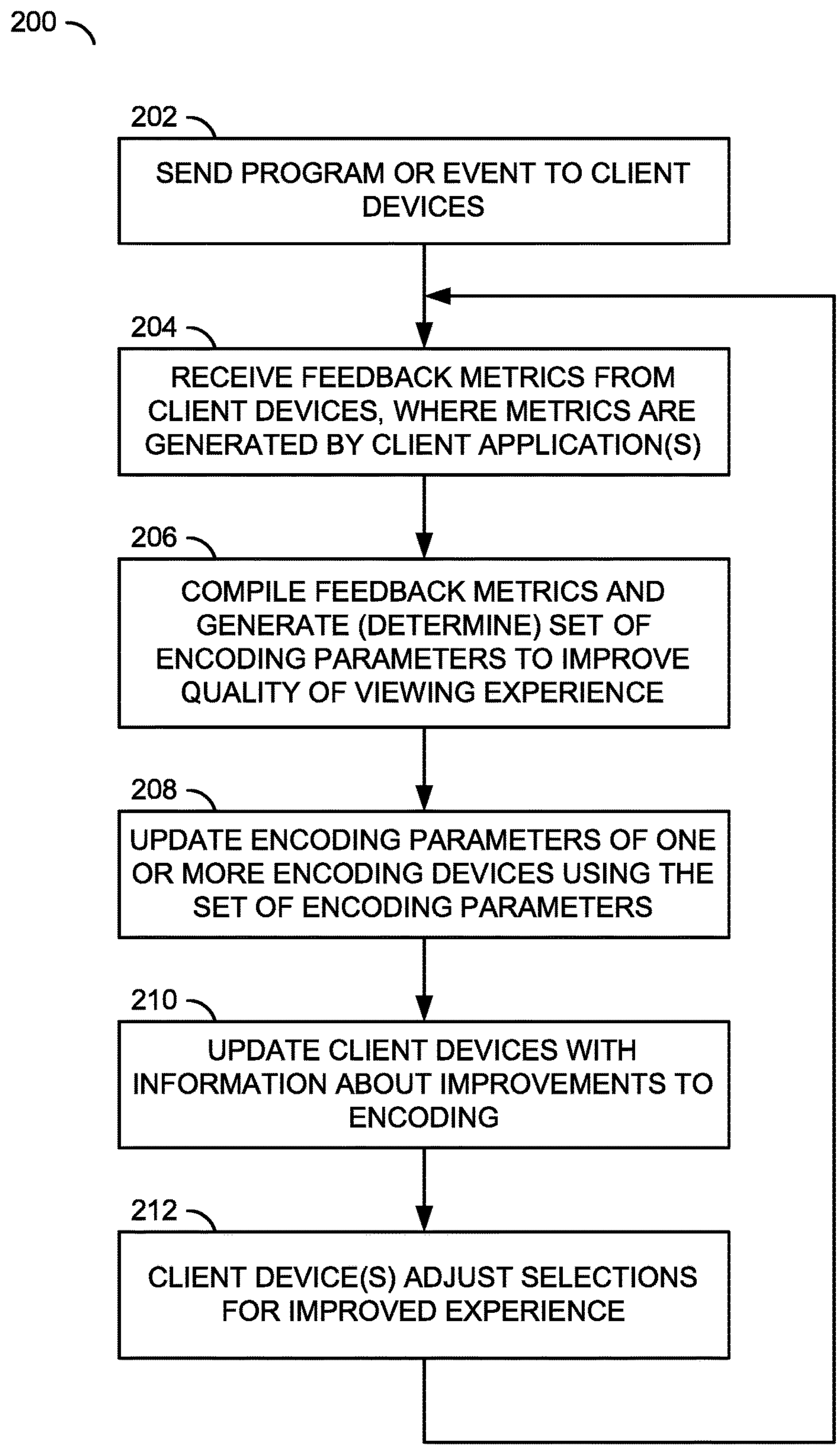
FIG. 2 is a flow diagram illustrating an example system level process using client feedback to optimize encoding.

Referring to FIG. 2, a flow diagram is shown illustrating a process 200 in accordance with an embodiment of the present invention. In one example, the process (or method) 200 may comprise a step (or state) 202, a step (or state) 204, a step (or state) 206, a step (or state) 208, a step (or state) 210, and a step (or state) 212. In the step 202, the process 200 may send content (e.g., live event presentation, video on demand program, etc.) to a number of client devices. In the step 204, the process 200 may generate a number of metrics in the client devices and send the metrics as feedback. In the step 206, the process 200 may compile the feedback from the client devices and determine a set of encoding parameters that would improve a quality level of an experience had by users of the client devices. In the step 208, the process 200 may use the set of encoding parameters determined in the step 206 to update parameters of one or more encoding devices generating the content sent to the client devices. In the step 210, the process 200 may inform client devices (e.g., by sending a new client manifest) about the changes (improvements) made to the available content. In the step 212, the process 200 may adjust selections made by the client devices to improve the user experience. The steps 204 through 212 may be repeated as a continuous process during the program or event presentation.

Figure 3:
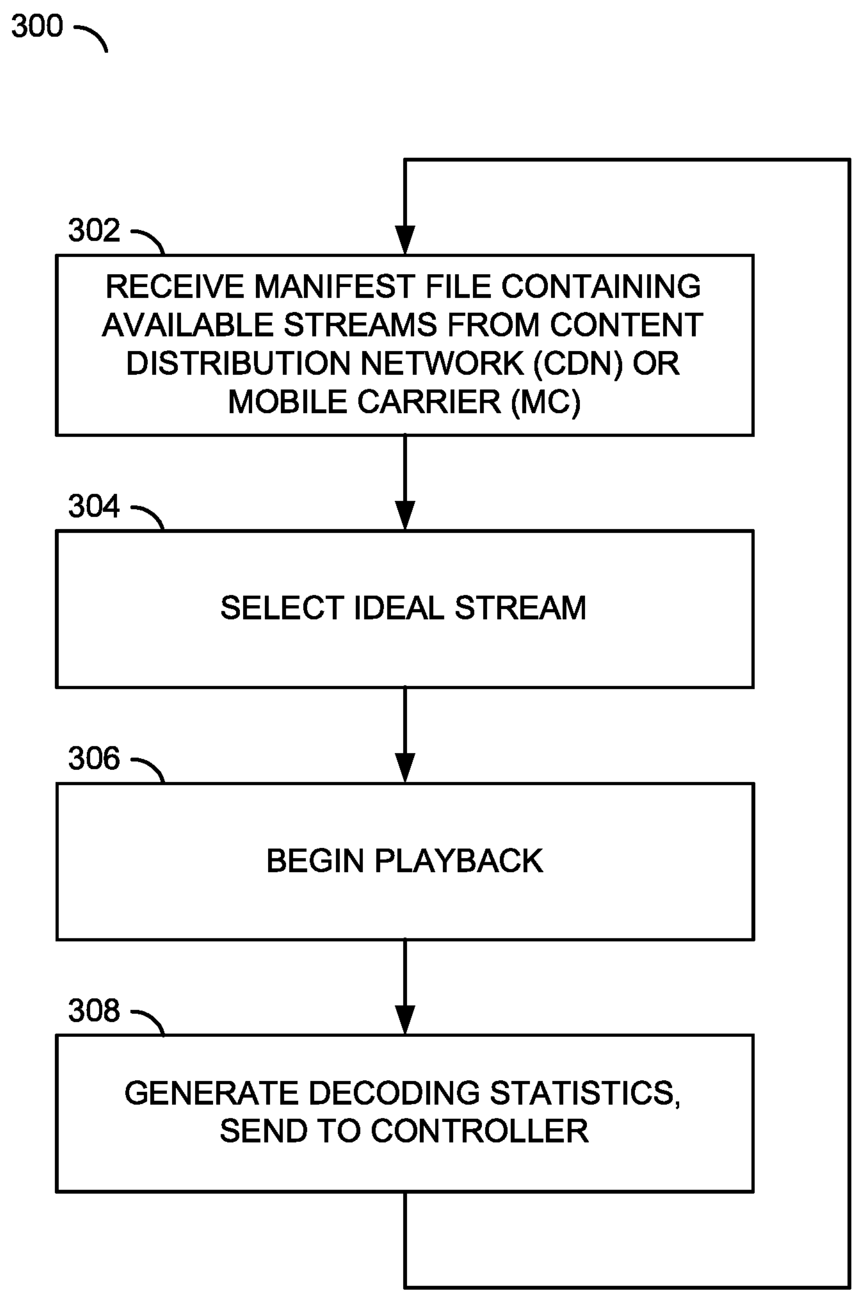
FIG. 3 is a flow diagram illustrating an example client level process for generating the feedback used in the system level process of FIG. 2.

Referring to FIG. 3, a flow diagram is shown illustrating a process 300 in accordance with an embodiment of the present invention. The process (or method) 300 may be implemented on a client device. In one example, the process 300 may comprise a step (or state) 302, a step (or state) 304, a step (or state) 306, and a step (or state) 308. In the step 302, the process 300 may receive a manifest file containing information about a plurality of streams available from a content distribution network (or mobile carrier). In the step 304, the process 300 may select one of the streams. In the step 306, the process 300 may begin playback of the selected stream. In the step 308, the process 300 may generate a set of decoding statistics while decoding the selected stream for playback. The decoding statistics may be sent as feedback to a system providing the content to the content distribution network (or mobile carrier). The process 300 may return to the step 302 and repeat with an updated manifest file comprising information regarding changes made to the streams available.

A system in accordance with an embodiment of the present invention may include a decoding application (or player) that monitors several metrics about the receiving and decoding of a received stream. In one example, the metrics may include, but are not limited to, receiving bandwidth, CPU/dedicated decoding hardware utilization by decoder application, frame decoding time/rate of video frames that are not displayed (e.g., dropped frames), native resolution of a respective display device, whether player is in full screen mode or not, window size of player (if not in full screen mode), and profile/level capability of decoder device. The player applications may reside on, for example, all video decoding devices, including, but not limited to computers, set-top boxes, cellular telephones, and mobile devices (e.g., laptops, tablets, smart phones, etc.). The player applications may reside on so called wireless (e.g., Wi-Fi) device, third generation (3G) and/or fourth generation (4G) mobile devices, and/or wired devices.

A system implemented in accordance with an example embodiment of the present invention may also include an encoder control device (or controller). The controller may receive information from one or more players viewing a live event or VOD asset. In one example, the controller may compile real time player metrics for all current viewers and apply, in one example, heuristics to compute a more optimized set of encoding parameters for the current audience. The controller may then signal the encoding device(s) to change the set of streams being produced to provide an optimized viewing experience. Anew client manifest may be sent to the player(s), so that the player(s) may choose to utilize a new stream when appropriate.

For many video codecs, decoders are capable of playing back streams at specified profiles and levels. If many devices in the current audience cannot decode the current streams (even if they have the bandwidth to do so), the controller may use the feedback information to add streams at the appropriate profile and level. With respect to GOP structure, most video codecs involved in adaptive bitrate streaming order video frames with a GOP structure of frame types. Certain parameters (e.g., the number of B-frames) may add quality at the expense of decoding computational power. If too many players cannot decode the frames in real-time, the controller may adjust the values for smoother video. Some codecs (e.g., H.264) may use multiple entropy coding modes to increase compression efficiency at the expense of decoding computational power. The controller may adjust the entropy coding mode if too many players cannot decode the streams in real-time.

The present invention generally provides many advantages in both live streaming and VOD. For live streaming, the system implemented in accordance with an embodiment of the present invention may be used to maintain the largest audience for higher advertising revenue, while controlling CDN/MC costs to maximize profit. A system implemented in accordance with an embodiment of the present invention may also be used to optimize the number of channels that may be effectively delivered over a fixed amount of bandwidth. For VOD content, a system implemented in accordance with an embodiment of the present invention may store a high-quality master copy of a video and create several adaptive streams based on the master copy. Over time the controller may create more optimized streams and delete un-used streams to optimize storage space. New devices (e.g., mobile phones with new resolutions and/or decode capabilities) may be automatically supported. The content owner may optimize the VOD streams over time to support the most popular player devices.

While the invention has been particularly shown and described with reference to the preferred embodiments thereof, it will be understood by those skilled in the art that various changes in form and details may be made without departing from the scope of the invention.

What is claimed is:

1. A method comprising:

delivering a manifest file including information about one or more available content streams to one or more client devices;

delivering a content stream from the available content streams stored in a content cache area to a client device from the one or more client devices, the content stream selected based upon said information in said manifest file and one or more characteristics of the client device; and receiving player metrics generated by the client device and sending the player metrics to a data store, the data store configured to store the player metrics received from the one or more client devices and present the stored player metrics as feedback to a controller in communication with the data store.

2. The method of claim 1, further comprising:

determining a set of encoding parameters based at least on the feedback.

3. The method of claim 2, wherein the set of encoding parameters includes at least one of display resolution, bitrate, profile and level, group of picture structure, or entropy coding.

4. The method of claim 2, further comprising:

determining an optimized set of encoding parameters for the one or more client devices by an analysis system.

5. The method of claim 3, further comprising:

causing at least one encoder to generate at least one updated content stream based at least on the set of encoding parameters or the optimized set of encoding parameters.

6. The method of claim 5, further comprising:

sending an updated manifest file indicating changes to the content streams to the one or more client devices.

7. The method of claim 5, further comprising:

detecting that a client device is unable to decode the content streams; and sending an instruction to the at least one encoder to add a content stream that can be decoded by the client device.

8. The method of claim 1, wherein the feedback includes at least one of receiving bandwidth, decoding hardware utilization, dropped frames, native resolution, window size, or capability of decoder device.

9. A system comprising:

one or more content cache areas configured to store a stream selected from one or more content streams generated by a controller, receive player metrics from one or more client devices, and send the player metrics to the controller as feedback; and a data store in communication with the controller, the data store configured to compile the player metrics received from the one or more client devices and present the compiled player metrics as the feedback to the controller, wherein the controller adjusts generation of the streams based on the compiled player metrics.

10. The system of claim 9, wherein the controller determines a set of encoding parameters based at least on the feedback.

11. The system of claim 10, wherein the set of encoding parameters includes at least one of display resolution, bitrate, profile and level, group of picture structure, or entropy coding.

12. The system of claim 10, further comprising:

an analysis system configured to an optimized set of encoding parameters for the one or more client devices.

13. The system of claim 12, further comprising:

at least one encoder configured to change the content streams based at least on the set of encoding parameters or the optimized set of encoding parameters.

14. The system of claim 13, wherein the controller sends a manifest file indicating changes to the content streams to the one or more client devices.

15. The system of claim 13, wherein the controller is further configured to:

detect that a client device is unable to decode the content streams; and send an instruction to the at least one encoder to add a content stream that can be decoded by the client device.

16. The system of claim 9, wherein the feedback includes at least one of receiving bandwidth, decoding hardware utilization, dropped frames, native resolution, window size, or capability of decoder device.

17. A method comprising:

receiving player metrics generated by one or more client devices during playback of one or more content streams, the content streams generated by at least one encoder based at least on encoding parameters received from a controller;

compiling the player metrics received from the one or more client devices into feedback;

sending the feedback to the controller, wherein the controller causes the at least one encoder to generate at least one new content stream using updated encoding parameters based on the feedback.

18. The method of claim 17, further comprising:

detecting that a client device is unable to decode the content streams; and sending an instruction to the at least one encoder to add a content stream that can be decoded by the client device.

19. The method of claim 17, further comprising:

sending an updated manifest file indicating changes to the content streams to the one or more client devices.

20. The method of claim 17, wherein the feedback includes at least one of receiving bandwidth, decoding hardware utilization, dropped frames, native resolution, window size, or capability of decoder device.

* * * * *